United States Patent
Sada

(10) Patent No.: US 10,624,346 B2
(45) Date of Patent: Apr. 21, 2020

(54) HERBICIDAL COMPOSITION AND METHOD FOR CONTROLLING WEEDS

(71) Applicant: Sumitomo Chemical Company, Limited, Tokyo (JP)

(72) Inventor: Yoshinao Sada, Kasai (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 16/248,848

(22) Filed: Jan. 16, 2019

(65) Prior Publication Data

US 2019/0142005 A1 May 16, 2019

Related U.S. Application Data

(63) Continuation of application No. PCT/JP2017/026531, filed on Jul. 21, 2017.

(30) Foreign Application Priority Data

Jul. 22, 2016 (JP) ................................. 2016-144153
Mar. 31, 2017 (JP) ................................. 2017-070209

(51) Int. Cl.
*A01N 43/54* (2006.01)
*A01N 37/40* (2006.01)
*A01N 57/20* (2006.01)
*A01N 33/04* (2006.01)

(52) U.S. Cl.
CPC ............. *A01N 43/54* (2013.01); *A01N 33/04* (2013.01); *A01N 37/40* (2013.01); *A01N 57/20* (2013.01)

(58) Field of Classification Search
CPC combination set(s) only.
See application file for complete search history.

(56) References Cited

U.S. PATENT DOCUMENTS

| | | | |
|---|---|---|---|
| 5,175,353 A | 12/1992 | Jones et al. | |
| 6,537,948 B1 | 3/2003 | Tohyama et al. | |
| 9,288,984 B2 * | 3/2016 | Zhang | ............ A01N 37/40 |
| 2009/0233796 A1 | 9/2009 | North | |
| 2012/0184434 A1 | 7/2012 | Xu et al. | |
| 2015/0173354 A1 | 6/2015 | Nolte et al. | |
| 2015/0210723 A1 | 7/2015 | Xu et al. | |
| 2016/0309713 A1 | 10/2016 | Cannan et al. | |

FOREIGN PATENT DOCUMENTS

| | | |
|---|---|---|
| JP | 2008522965 A | 7/2008 |
| JP | 2013506630 A | 2/2013 |
| WO | 2013189773 A1 | 12/2013 |
| WO | 2015091617 A1 | 6/2015 |

OTHER PUBLICATIONS

International Preliminary Report on Patentability dated Jan. 22, 2019 in International Application No. PCT/JP2017/026531.
International Search Report dated Sep. 12, 2017 in International Application No. PCT/JP2017/026531.

* cited by examiner

*Primary Examiner* — John Pak
(74) *Attorney, Agent, or Firm* — Panitch Schwarze Belisario & Nadel LLP

(57) ABSTRACT

Provided is a herbicidal composition containing ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate and one or more dicamba salts selected from the group consisting of dicamba diglycolamine salt and dicamba N,N-bis(3-aminopropyl)methylamine salt. The herbicidal composition can exert an excellent control efficacy on weeds.

6 Claims, No Drawings

HERBICIDAL COMPOSITION AND METHOD FOR CONTROLLING WEEDS

CROSS-REFERENCE TO RELATED APPLICATIONS

This application is a continuation of International Application No. PCT/JP2017/026531, filed Jul. 21, 2017, which was published in the Japanese language on Jan. 25, 2018 under International Publication No. WO 2018/016641 A1, which claims priority under 35 U.S.C. § 119(b) to Japanese Patent Application No. 2016-144153, filed on Jul. 22, 2016, and Japanese Patent Application No. 2017-070209, filed on Mar. 31, 2017, and the disclosures of which are incorporated herein by reference in their entirety.

TECHNICAL FIELD

The present invention relates to a herbicidal composition and a method for controlling weeds.

BACKGROUND ART

Hitherto, herbicides are used for the purpose of controlling weeds, and many compounds have been known as an active ingredient for herbicides. For example, uracil compounds having a herbicidal activity are known as such compounds (see Patent Document 1).

CITATION LIST

Patent Document

Patent Document 1: U.S. Pat. No. 6,537,948

SUMMARY OF THE INVENTION

Problems to be Solved by Invention

An object of the present invention is to provide a herbicidal composition which exerts an excellent control efficacy on weeds.

Means to Solve Problems

The present inventor has found out that a combined use of ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate and one or more dicamba salts selected from the group consisting of dicamba diglycolamine salt and dicamba N,N-bis(3-aminopropyl)methylamine salt can exert an excellent control efficacy on weeds.

The present invention includes the following [1] to [8].

[1] A herbicidal composition comprising ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate and one or more dicamba salts selected from the group consisting of dicamba diglycolamine salt and dicamba N,N-bis(3-aminopropyl)methylamine salt.

[2] The herbicidal composition according to [1], wherein a weight ratio of ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate to the dicamba salt(s) is 1:1 to 1:200.

[3] The herbicidal composition according to [1] or [2], wherein the dicamba salt is a dicamba diglycolamine salt.

[4] The herbicidal composition according to [1] or [2], wherein the dicamba salt is a dicamba N,N-bis(3-aminopropyl)methylamine salt.

[5] The herbicidal composition according to any one of [1] to [4], wherein the composition comprises further glyphosate salt.

[6] A method for controlling weeds, comprising a step of applying the herbicidal composition according to any one of [1] to [5] to a place where weeds are growing or will grow.

[7] The method according to [6], wherein the place where weeds are growing or will grow is a crop field.

[8] The method according to [7], wherein the crop field is a field of soybeans, corn, or cotton.

The present invention can control weeds with high efficacy.

DESCRIPTION OF EMBODIMENTS

The herbicidal composition of the present invention (hereinafter, referred to as "present composition") comprises ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (hereinafter, referred to as "compound X") and one or more dicamba salts selected from the group consisting of dicamba diglycolamine salt and dicamba N,N-bis(3-aminopropyl)methylamine salt (hereinafter, referred to as "dicamba BAPMA salt").

The method for controlling weeds of the present invention (hereinafter, referred to as "present method") comprises a step of applying the present composition to a place where weeds are growing or will grow in a crop field, a vegetable field, a land under perennial crops, or a non-crop area, etc.

The compound X is a compound represented by the following formula (1), which is described in U.S. Pat. No. 6,537,948, and can be produced according to a known process.

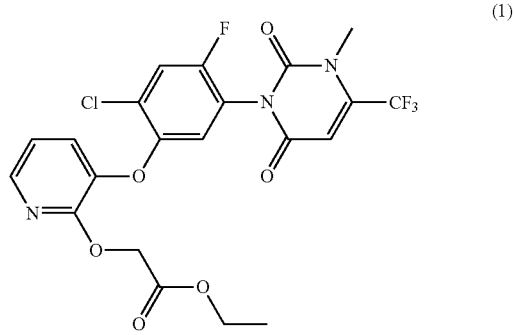 [SMILES: CCOC(=O)COc1ncccc1Oc1cc(-n2c(=O)cc(C(F)(F)F)n(C)c2=O)c(F)cc1Cl]

(1)

Dicamba diglycolamine salt is a compound described in U.S. Pat. No. 5,175,353. A herbicide containing the compound as an active ingredient is commercially available under the trade name of CLARITY® and the like.

Dicamba BAPMA salt is a compound described in U.S. Pat. No. 8,987,167. A herbicide containing the compound as an active ingredient is commercially available under the trade name of ENGENIA® and the like.

The present composition is usually a formulation prepared by mixing the compound X and dicamba salt with a carrier such as a solid carrier and a liquid carrier, and adding auxiliary agents for formulation such as surfactant as necessary.

Preferable formulation type is an aqueous liquid suspension formulation, a wettable powder, a water dispersible granule, a granule or an emulsifiable concentrate. The present composition may be used by mixing with a formulation containing other herbicides as an active ingredient.

Further, the present composition may comprise other herbicidal active ingredient(s).

The total content of the compound X and dicamba salt in the present composition is usually within a range of 0.01 to 99% by weight, preferably 1 to 80% by weight.

In addition, a mixing ratio of the compound X to dicamba salt in the present composition is within a range of 1:1 to 1:200, preferably 1:5 to 1:100 by weight ratio.

The present composition can exert a synergistic herbicidal effect on a broad range of weeds compared to the effect that is expected from the effects obtained when each one of the compound X and dicamba salt is applied alone. Further, the present composition can efficiently control a broad range of weeds in a crop field, a vegetable field, each where a normal tilled or non-tilled cropping is performed, a land under perennial crops, or a non-crop area, while producing no harmful effect which may be a problem on useful plants.

The present composition may be applied to the agricultural field where crop seeds were seeded or will be seeded before, concurrently with, and/or after seeding the crop seeds treated with one or more compounds selected from the group consisting of insecticide compounds, nematicide compounds, and fungicide compounds and the like.

The present composition may be used in combination with other agrochemical active compounds. The insecticide compounds, nematicide compounds, and fungicide compounds which may be used in combination with the present composition include neonicotinoid compounds, diamide compounds, carbamate compounds, organophosphorus compounds, biological nematicide compounds, other insecticide compounds and nematicide compounds, as well as azole compounds, strobilurin compounds, metalaxyl compounds, SDHI compounds, other fungicide compounds, and plant growth regulators.

The crop field in the present invention may include a food crop field such as a peanut field, a soybean field, a corn field and a cereal field, a feed crop field such as a sorghum field and an oat field, an industrial crop field such as a cotton field and a rapeseed field, and sugar crops such as a sugarcane field and a sugar beet field. The vegetable field in the present invention may include a field for cultivating solanaceae vegetables (eggplant, tomato, green pepper, chili pepper, potato, etc.), a field for cultivating cucurbitaceae vegetables (cucumber, pumpkin, zucchini, watermelon, melon, etc.), a field for cultivating cruciferous vegetables (radish, turnip, horseradish, kohlrabi, Chinese cabbage, cabbage, mustard, broccoli, cauliflower, etc.), a field for cultivating asteraceae vegetables (burdock, crown daisy, artichoke, lettuce, etc.), a field for cultivating liliaceae vegetables (welsh onion, onion, garlic, asparagus, etc.), a field for cultivating umbelliferae vegetables (carrot, parsley, celery, parsnip, etc.), a field for cultivating chenopodiaceae vegetables (spinach, beet, etc.), a field for cultivating lamiaceae vegetables (perilla, mint, basil, lavender, etc.), a strawberry field, a sweet potato field, a yam field, and an aroid field, etc.

The land under perennial crops in the present invention may include an orchard, a tea field, a mulberry field, a coffee field, a banana field, a palm field, a flowering tree farm, a flowering tree field, a planting stock field, a nursery field, a forest land, or a garden. The orchard tree in the present invention may include pomaceous fruits (apple, pear, Japanese pear, Chinese quince, quince, etc.), stone fruits (peach, plum, nectarine, Japanese apricot, yellow peach, apricot, prune, etc.), citrus fruits (citrus unshiu, orange, lemon, lime, grapefruit, etc.), nut trees (chestnut, walnut, hazelnut, almond, pistachio, cashew nut, macadamia nut, etc.), berry fruits (grape, blueberry, cranberry, blackberry, raspberry, etc.), persimmon, olive, loquat, etc.

The non-crop area in the present invention may include an athletic field, an empty lot, a railroad edge, a park, a parking area, a road edge, a dry riverbed, under power lines, a building land, a factory site, etc.

The crop cultivated in the crop field in the present invention is not limited as long as the crop is a variety which is generally cultivated as a crop. The plant of such variety also includes a plant in which the resistance to PPO inhibitors such as flumioxazin, 4-hydroxyphenylpyruvate dioxygenase inhibitors such as isoxaflutole, acetolactate synthase (hereinafter, abbreviated as "ALS") inhibitors such as imazethapyr and thifensulfuron-methyl, 5-enolpyruvylshikimate-3-phosphate synthase (hereinafter, abbreviated as "EPSP") inhibitors such as glyphosate, glutamine synthetase inhibitors such as glufosinate, auxin type herbicides such as 2,4-D and dicamba, acetyl-CoA carboxylase (hereinafter, abbreviated as "ACCase") inhibitors such as sethoxydim, or PSII inhibitors such as bromoxynil is imparted by a traditional breeding method, a genome editing, or a genetic engineering technique.

Examples of the plant in which the resistance is imparted by the traditional breeding method include STS soybeans having the resistance to sulfonylurea ALS inhibition-type herbicides such as thifensulfuron-methyl. Also, examples of the plant in which the resistance is imparted by the traditional breeding method include rice, wheat, corn, rapeseed, and sunflower having the resistance to imidazolinone type ALS inhibitors, which are already commercially-available under the trade name of CLEARFIELD® or EXPRESS®, etc. Further, examples of the plant in which the resistance is imparted by the traditional breeding method include corn and rice having the resistance to ACCase inhibitors, which have the trade name of POASTPROTECTED® or PROVISIA®, etc. Also, examples of the plant in which the resistance is imparted by the traditional breeding method include Triazine Tolerant rapeseed having the resistance to PSII inhibitors.

Examples of the plant in which the resistance is imparted by the genetic engineering technique include soybean, corn, cotton, and rapeseed having the resistance to glyphosate, which are already commercially-available under the trade name of ROUNDUPREADY® or GLYTOL®, etc. Also, there is a soybean having the resistance to glufosinate by the genetic engineering technique, which is already commercially-available under the trade name of LIBERTYLINK®, etc. There are varieties of soybean and corn having the resistance to both of glyphosate and ALS inhibitors, which have the trade name of OPTIMUM™, GAT™.

Also, there is a soybean having the resistance to imidazolinone type ALS inhibitors by the genetic engineering technique, which has been developed under the name of Cultivance. Further, there is a soybean variety having the tradename of ROUNDUPREADY® XTEND as a soybean having the resistance to both of glyphosate and dicamba by the genetic engineering technique.

The crop plant having the resistance to both of phenoxy acid herbicides such as 2,4-D, MCPA, dichlorprop and mecoprop, and aryloxyphenoxypropionic acid herbicides such as quizalofop, haloxyfop, fluazifop, diclofop, fenoxaprop, metamifop, cyhalofop and clodinafop can be generated by transforming the gene encoding aryloxyalkanoate dioxygenase, and there is a soybean variety having the trade name of ENLIST-E3™.

The above-mentioned plants include a plant in which the ability to synthesize, for example, selective toxins known as genus *Bacillus* has been imparted by genetic engineering techniques.

The toxins expressed in the genetically-modified plant include insecticidal proteins derived from *Bacillus cereus* or *Bacillus popilliae*; δ-endotoxins such as Cry1Ab, Cry1Ac, Cry1F, Cry1Fa2, Cry2Ab, Cry3A, Cry3Bb1 and Cry9C derived from *Bacillus thuringiensis*, insecticidal proteins such as VIP1, VIP2, VIP3 and VIP3A; insecticidal proteins derived from nematoda; toxins produced by animals such as scorpion toxin, spider toxin, bee toxin and insect-specific neurotoxin; filamentous fungi toxins; plant lectin; agglutinin; protease inhibitors such as trypsin inhibitor, serine protease inhibitor, patatin, cystatin and papain inhibitor; ribosome inactivating proteins (RIP) such as ricin, corn-RIP, abrin, luffin, saporin and bryodin; steroid-metabolizing enzymes such as 3-hydroxysteroid oxidase, ecdysteroid-UDP-glucosyltransferase and cholesterol oxidase; ecdysone inhibitors; HMG-CoA reductases; ion channel inhibitors such as sodium channel and calcium channel inhibitor; juvenile hormone esterases; diuretic hormone receptors; stilbene synthases; bibenzyl synthases; chitinases; and glucanases.

Further, examples of the toxin expressed in the genetically-modified plant include δ-endotoxin proteins such as Cry1Ab, Cry1Ac, Cry1F, Cry1Fa2, Cry2Ab, Cry3A, Cry3Bb1, Cry9C, Cry34Ab and Cry35Ab, hybrid toxins of insecticidal proteins such as VIP1, VIP2, VIP3 and VIP3A, partially defected toxins, and modified toxins. The hybrid toxin can be generated by a novel combination of different domains in the proteins using the recombinant technique. As a partially defected toxin, Cry1Ab in which a part of the amino acid sequence is deleted is known. In a modified toxin, one or more amino acids in the naturally occurring toxin is substituted. Examples of the toxins and the recombinant plants which can produce the toxins are described in EP-A-0374753, WO93/07278, WO95/34656, EP-A-0427529, EP-A-451878, and WO03/052073, etc. The toxin contained in the recombinant plant provides the plant with the resistance to, in particular, Coleoptera pests, Diptera pests, and Lepidoptera pests.

In addition, genetically-modified plants having one or more insecticidal pest-resistant genes and expressing one or more toxins are already known and some of the plants are marketed. Examples of the genetically-modified plants include INTACTA™. The plants used in the present invention include a plant imparted with the resistance to aphid such as Rag 1 (Resistance Aphid Gene 1) gene-transformed soybean.

The plants used in the present invention also include a plant imparted with the resistance to nematoda using the traditional breeding method or the genetic engineering technique. The genetic engineering technique used for imparting the resistance to nematoda includes RNAi.

The above plants include a plant imparted with an ability to produce an anti-pathogenic substance having a selective action using the genetic engineering technique. As an example of the anti-pathogenic substance, PR proteins (PRPs, EP-A-0392225) are known. The anti-pathogenic substances and the genetically-modified plants producing the substances are disclosed in EP-A-0392225, WO95/33818, and EP-A-0353191. Examples of the anti-pathogenic substance expressed in the genetically-modified plant include ion channel inhibitors such as sodium channel inhibitors and calcium channel inhibitors (KP1, KP4, and KP6 toxins produced by virus are known); stilbene synthases; bibenzyl synthases; chitinases; glucanases; PR proteins; and anti-pathogenic substances produced by microorganisms such as peptide antibiotics, antibiotics having heterocycle(s), and protein factors relating to plant disease-resistance (referred to as "plant disease-resistance gene", which is described in WO03/000906).

The above plants include a plant imparted with useful traits such as a trait improving oil component or a trait increasing content of amino acid using the genetic engineering technique. Examples of the plants include VISTIVE®, which is a low-linolenic soybean containing a reduced linolen. Further, the above crops include a crop imparted with traits such as a trait with disease-resistance, a trait with drought stress-resistance and a trait increasing sugar content. Examples of the crops include DROUGHTGARD®.

In addition, the plants include a stack variety in which two or more useful traits such as the above conventional herbicidal trait or herbicide-resistant gene, insecticidal pest-resistant gene, anti-pathogenic substance producing gene, trait improving oil component, and trait increasing content of amino acid are combined. The plants include a plant generated using the genome editing technique instead of the genetic engineering technique.

In the present method, the present composition is applied to a place where weeds are growing or will grow. The means for applying the present composition include, for example, a process for spraying the present composition on the soil and a process for spraying the present composition to weeds.

The application rate of the present composition is usually 1 to 5000 g per 10000 $m^2$, preferably 2 to 2000 g per 10000 $m^2$, more preferably 5 to 1000 g per 10000 $m^2$, as a total amount of the compound X and dicamba salt.

In the present method, an adjuvant may be mixed with the present composition to apply.

Although a type of the adjuvant is not particularly limited, the adjuvants include oils such as Agri-Dex and MSO, nonions (ester or ether of polyoxyethylene) such as Induce, anions (substituted sulfonate) such as Gramin S, cations (polyoxyethylene amine) such as Genamin T 200BM, and organic silicons such as Silwett L77.

Although a pH and hardness of the spray liquid prepared in the application of the present composition are not particularly limited, the pH is usually within a range of 5 to 9 and the hardness is usually within a range of 0 to 500.

Although a period of time for applying the present composition is not particularly limited, the period of time is usually within a range from 5 a.m. to 9 p.m., and the photon flux density is usually 10 to 2500 $\mu mol/m^2/s$.

When the present composition is applied to a crop field, the present composition may be applied to the crop field before seeding crop seeds and the present composition may be applied concurrently with and/or after seeding crop seeds. Namely, the present composition is applied once before, concurrently with, or after seeding crop seeds; twice except before seeding crop seeds, twice except concurrently with seeding crop seeds, or twice except after seeding crop seeds; or three times before, concurrently with, and after seeding crop seeds.

When the present composition is applied before seeding crop seeds, the present composition is applied from 50 days before seeding to immediately before seeding, preferably from 30 days before seeding to immediately before seeding, more preferably from 20 days before seeding to immediately before seeding, still preferably from 10 days before seeding to immediately before seeding.

When the present composition is applied after seeding crop seeds, the present composition is applied normally from immediately after seeding to before flowering. The present composition is applied more preferably from immediately after seeding to before sprouting, or from 1 to 6 leaf stages of crops.

The case where the present composition is applied concurrently with seeding the crop seeds is a case where a sowing machine and a spraying machine are integrated with each other.

Examples of the weeds which can be controlled by the present composition include the following weeds, but are not limited thereto.

Urticaceae weeds: himeirakusa (small nettle; *Urtica urens*)

Polygonaceae weeds: sobakazura (black bindweed; *Polygonum convolvulus*), sanaetade (pale *persicaria; Polygonum lapathifolium*), amerikasanaetade (Pennsylvania smartweed; *Polygonum pensylvanicum*), harutade (redshank; *Polygonum persicaria*), inutade (bristly lady's-thumb; *Polygonum longisetum*), michiyanagi (knotgrass; *Polygonum aviculare*), haimichiyanagi (equal-leaved knotgrass; *Polygonum arenastrum*), itadori (Japanese knotweed; *Polygonum cuspidatum*), gishigishi (Japanese dock; *Rumex japonicus*), nagabagishigishi (curly dock; *Rumex crispus*), ezonogishigishi (blunt-leaved dock; *Rumex obtusifolius*), suiba (common sorrel; *Rumex acetosa*)

Portulacaceae weeds: suberihiyu (common purslane; *Portulaca oleracea*)

Caryophyllaceae weeds: hakobe (common chickweed; *Stellaria media*), miminagusa (common mouse-ear; *Cerastium holosteoides*), orandamiminagusa (sticky mouse-ear; *Cerastium glomeratum*), otsumekusa (corn spurrey; *Spergula arvensis*), mantema (five-wound catchfly; Silene *gallica*)

Molluginaceae weeds: kurumabazakuroso (carpetweed; *Mollugo verticillata*)

Chenopodiaceae weeds: shiroza (common lambsquarters; *Chenopodium album*), kearitaso (Indian goosefoot; *Chenopodium ambrosioides*), hokigi (*kochia; Kochia scoparia*), noharahijiki (spiny saltwort; *Salsola kali*), Orach (*Atriplex* spp.)

Amaranthaceae weeds: aogeito (redroot pigweed; *Amaranthus retroflexus*), aobiyu (slender amaranth; *Amaranthus viridis*), inubiyu (livid amaranth; *Amaranthus lividus*), haribiyu (spiny amaranth; *Amaranthus spinosus*), honagaaogeito (smooth pigweed; *Amaranthus hybridus*), ohonagaaogeito (Palmer amaranth; *Amaranthus palmeri*), hosobainubiyu (common waterhemp; *Amaranthus rudis*), hosoaogeito (green pigweed; *Amaranthus patulus*), hiyumodoki (tall waterhemp; *Amaranthus tuberculatos*), amerikabiyu (prostrate pigweed; *Amaranthus blitoides*), haibiyu (large-fruit amaranth; *Amaranthus deflexus*), mucronate amaranth (*Amaranthus quitensis*), nagaetsurunogeito (alligator weed; *Alternanthera philoxeroides*), tsurugeito (sessile alligator weed; *Alternanthera sessilis*), sanguinaria (perrotleaf; *Alternanthera tenella*)

Papaveraceae weeds: hinageshi (common poppy; *Papaver rhoeas*), azamigeshi (Mexican prickle poppy; *Argemone mexicana*)

Brassicaceae weeds: seiyonodaikon (wild radish; *Raphanus raphanistrum*), Radish (*Raphanus sativus*), noharagarashi (wild mustard; *Sinapis arvensis*), nazuna (shepherd's purse; *Capsella bursa-pastoris*), seiyokarashina (white mustard; *Brassica juncea*), himekujiragusa (pinnate tansy mustard; *Descurainia pinnata*), sukashitagobo (marsh yellowcress; *Rorippa islandica*), kirehainugarashi (yellow fieldcress; *Rorippa sylvestris*), gumbainazuna (field pennycress; *Thlaspi arvense*), miyagarashi (turnip weed; *Myagrum rugosum*), mamegumbainazuna (Virginia pepperweed; *Lepidium virginicum*), karakusanazuna (slender wartcress; *Coronopus didymus*)

Capparaceae weeds: African cabbage (*Cleome affinis*)

Fabaceae weeds: kusanemu (Indian joint vetch; *Aeschynomene indica*), zigzag joint vetch (*Aeschynomene rudis*), amerikatsunokusanemu (hemp *sesbania; Sesbania exaltata*), ebisugusa (sickle pod; *Cassia obtusifolia*), habuso (coffee *senna; Cassia occidentalis*), juzuhagi (Florida beggar weed; *Desmodium tortuosum*), noharahagi (wild groundnut; *Desmodium adscendens*), shirotsumekusa (white clover; *Trifolium repens*), kuzu (kudzu; *Pueraria lobata*), karasunoendo (narrowleaf vetch; *Vicia angustifolia*), tanukikomatsunagi (hairy indigo; *Indigofera hirsuta*), *Indigofera* truxillensis, yaseisasage (common cowpea; *Vigna sinensis*)

Oxalidaceae: katabami (creeping wood sorrel; *Oxalis corniculata*), ottachikatabami (European wood sorrel; *Oxalis stricta*), purple shamrock (*Oxalis oxyptera*)

Geraniaceae weeds: amerikafuro (Carolina geranium; *Geranium carolinense*), orandafuro (common storksbill; *Erodium cicutarium*)

Euphorbiaceae weeds: todaigusa (sun spurge; *Euphorbia helioscopia*), onishikiso (annual spurge; *Euphorbia maculata*), konishikiso (prostrate spurge; *Euphorbia humistrata*), hagikuso (Hungarian spurge; *Euphorbia esula*), shojoso (wild poinsettia; *Euphorbia heterophylla*), hyssop-leaf sandmat (*Euphorbia brasiliensis*), enokigusa (asian copperleaf; *Acalypha australis*), tropic *croton* (*Croton glandulosus*), lobed *croton* (*Croton lobatus*), burajirukomikanso (long-stalked *phyllanthus; Phyllanthus corcovadensis*), togoma (castor bean; *Ricinus communis*)

Malvaceae weeds: ichibi (velvetleaf; *Abutilon theophrasti*), kingojika (arrow-leaf *sida; Sida rhombifolia*), marubakingojika (heart-leaf *sida; Sida cordifolia*), amerikakingojika (prickly *sida; Sida spinosa*), *Sida glaziovii*, *Sida santaremnensis*, ginsenka (bladder weed; *Hibiscus trionum*), nishikiaoi (spurred *anoda; Anoda cristata*), enokiaoi (spine-seeded false-mallow; *Malvastrum coromandelianum*)

Sterculiaceae weeds: kobambanoki (Florida *waltheria; Waltheria indica*)

Violaceae weeds: makibasumire (field violet; *Viola arvensis*), wairudopanji (wild violet; *Viola tricolor*)

Cucurbitaceae weeds: arechiuri (bur cucumber; *Sicyos angulatus*), wild cucumber (*Echinocystis lobata*), yaseinigauri (bitter balsam apple; *Momordica charantia*)

Lythraceae weeds: ezomisohagi (purple loosestrife; *Lythrum salicaria*)

Apiaceae weeds: chidomegusa (lawn pennywort; *Hydrocotyle sibthorpioides*)

Sapindaceae weeds: fusenkazura (heartseed; *Cardiospermum halicacabum*)

Primulaceae weeds: akabanarurihakobe (scarlet pimpernel; *Anagallis arvensis*)

Asclepiadaceae weeds: otowata (common milkweed; *Asclepias syriaca*), honeyvine milkweed (*Ampelamus albidus*)

Rubiaceae weeds: catchweed bedstraw (*Galium aparine*), yaemugura (*Galium spurium* var. echinospermon), hirohafutabamugura (broadleaf buttonweed; *Spermacoce latifolia*), burajiruhashikagusamodoki (Brazil calla lily; *Richardia brasiliensis*), uingudofuarusubotanuido (broadleaf buttonweed; *Borreria alata*)

Convolvulaceae weeds: asagao (Japanese morning glory; *Ipomoea nil*), amerikaasagao (ivy-leaf morning glory; *Ipomoea hederacea*), marubaasagao (tall morning glory; *Ipomoea purpurea*), marubaamerikaasagao (entire-leaf morning glory; *Ipomoea hederacea* var. *integriuscula*), mameasagao (pitted morning glory; *Ipomoea lacunosa*), hoshiasagao (three-lobe morning glory; *Ipomoea triloba*), noasagao (blue morning glory; *Ipomoea acuminata*), tsutanoharuko (scarlet morning glory; *Ipomoea hederifolia*), marubaruko (red morning glory; *Ipomoea coccinea*), rukoso (cypress-vine morning glory; *Ipomoea quamoclit*), *Ipomoea grandifolia*, *Ipomoea aristolochiaefolia*, momijibahirugao (Cairo morning glory; *Ipomoea cairica*), seiyohirugao (field bindweed; *Convolvulus arvensis*), kohirugao (Japanese false bindweed; *Calystegia hederacea*), hirugao (Japanese bindweed; *Calystegia japonica*), tsutanohahirugao (ivy woodrose; *Merremia hederacea*), hairy woodrose (*Merremia aegyptia*), roadside woodrose (*Merremia cissoides*), okinaasagao (small-flower morning glory; *Jacquemontia tamnifolia*)

Boraginaceae weeds: wasurenagusa (field forget-me-not; *Myosotis arvensis*)

Lamiaceae weeds: himeodorikoso (purple deadnettle; *Lamium purpureum*), hotokenoza (common henbit; *Lamium amplexicaule*), tamazakimehajiki (lion's ear; *Leonotis nepetaefolia*), nioinigakusa (wild spikenard; *Hyptis suaveolens*), *Hyptis lophanta*, mehajiki (Siberian motherwort; *Leonurus sibiricus*), yabuchorogi (field-nettle betony; *Stachys arvensis*)

Solanaceae weeds: yoshuchosenasagao (jimsonweed; *Datura stramonium*), inuhozuki (black nightshade; *Solanum nigrum*), teriminoinuhozuki (American black nightshade; *Solanum americanum*), amerikainuhozuki (eastern black nightshade; *Solanum ptycanthum*), keinuhozuki (hairy nightshade; *Solanum sarrachoides*), tomatodamashi (buffalo bur; *Solanum rostratum*), kinginnasubi (soda-apple nightshade; *Solanum aculeatissimum*), wairudotomato (sticky nightshade; *Solanum sisymbriifolium*), warunasubi (horse nettle; *Solanum carolinense*), sennarihozuki (cutleaf groundcherry; *Physalis angulata*), smooth groundcherry (*Physalis subglabrata*), osennari (apple of Peru; *Nicandra physalodes*)

Scrophulariaceae weeds: furasabaso (ivyleaf speedwell; *Veronica hederaefolia*), oinunofuguri (common speedwell; *Veronica persica*), tachiinunofuguri (corn speedwell; *Veronica arvensis*)

Plantaginaceae weeds: obako (Asiatic plantain; *Plantago asiatica*)

Asteraceae weeds: onamomi (common cocklebur; *Xanthium pensylvanicum*), oonamomi (large cocklebur; *Xanthium occidentale*), yaseihimawari (common sunflower; *Helianthus annuus*), kamitsure (wild chamomile; *Matricaria chamomilla*), inukamitsure (scentless chamomile; *Matricaria perforata*), corn marigold (*Chrysanthemum segetum*), oroshagiku (rayless mayweed; *Matricaria matricarioides*), yomogi (Japanese mugwort; *Artemisia princeps*), oshuyomogi (common mugwort; *Artemisia vulgaris*), Chinese mugwort (*Artemisia verlotorum*), seitakaawadachiso (tall goldenrod; *Solidago altissima*), seiyotampopo (common dandelion; *Taraxacum officinale*), hakidamegiku (hairy *galinsoga; Galinsoga ciliata*), kogomegiku (small-flower *galinsoga; Galinsoga parviflora*), noborogiku (common groundsel; *Senecio vulgaris*), flower-of-souls (*Senecio brasiliensis*), *Senecio grisebachii*, oarechinogiku (Guernsey fleabane; *Conyza sumatrensis*), arechinogiku (fleabane; *Conyza bonariensis*), himemukashiyomogi (marestail; *Conyza canadensis*), butakusa (common ragweed; *Ambrosia artemisiaefolia*), kuwamodoki (giant ragweed; *Ambrosia trifida*), kosendangusa (hairy beggarticks; *Bidens pilosa*), amerikasendangusa (common beggarticks; *Bidens frondosa*), greater beggarticks (*Bidens subalternans*), seiyotogeazami (Canada thistle; *Cirsium arvense*), amerikaoniazami (black thistle; *Cirsium vulgare*), mariaazami (blessed milkthistle; *Silybum marianum*), musk thistle (*Carduus nutans*), togechisha (prickly lettuce; *Lactuca serriola*), nogeshi (annual sowthistle; *Sonchus oleraceus*), oninogeshi (spiny sowthistle; *Sonchus asper*), beach creeping oxeye (*Wedelia glauca*), perfoliate blackfoot (*Melampodium perfoliatum*), usubeninigana (red tasselflower; *Emilia sonchifolia*), shiozakiso (wild marigold; *Tagetes minuta*), para cress (*Blainvillea latifolia*), kotobukigiku (coat buttons; *Tridax procumbens*), ieruba porosa (Bolivian coriander; *Porophyllum ruderale*), Paraguay starbur (*Acanthospermum australe*), bristly starbur (*Acanthospermum hispidum*), fusengazura (balloon vine; *Cardiospermum halicacabum*), kakkoazami (tropic *ageratum; Ageratum conyzoides*), common boneset (*Eupatorium perfoliatum*), amerikatakasaburo (American false daisy; *Eclipta alba*), dandoborogiku (fireweed; *Erechtites hieracifolia*), amerikanebarasuteingu (American cudweed; *Gamochaeta spicata*), urajirochichikogusa (linear-leaf cudweed; *Gnaphalium spicatum*), Jageria hitora (*Jaegeria hirta*), gomagiku (ragweed *parthenium; Parthenium hysterophorus*), menamomi (small yellow crownbeard; *Siegesbeckia orientalis*), merikentokinso (lawn burweed; *Soliva sessilis*)

Liliaceae weeds: wild onion (*Allium canadense*), wild garlic (*Allium vineale*)

Commelinaceae weeds: tsuyukusa (common dayflower; *Commelina communis*), marubatsuyukusa (tropical spiderwort; *Commelina benghalensis*), erect dayflower (*Commelina erecta*)

Poaceae weeds: inubie (common barnyardgrass; *Echinochloa crus-galli*), kohimebie (jungle rice; *Echinochloa colonum*), enokorogusa (green foxtail; *Setaria viridis*), akinoenokorogusa (giant foxtail; *Setaria faberi*), kinenokoro (yellow foxtail; *Setaria glauca*), amerikaenokorogusa (knotroot foxtail; *Setaria geniculata*), mehishiba (southern crabgrass; *Digitaria ciliaris*), large crabgrass (*Digitaria sanguinalis*), Jamaican crabgrass (*Digitaria horizontalis*), susukimehishiba (sourgrass; *Digitaria insularis*), ohishiba (goosegrass; *Eleusine indica*), suzumenokatabira (annual bluegrass; *Poa annua*), suzumenoteppo (short-awn foxtail; *Alopecurus aequalis*), blackgrass (*Alopecurus myosuroides*), karasumugi (wild oat; *Avena fatua*), seibammorokoshi (Johnsongrass; *Sorghum halepense*), shataken (grain *sorghum; Sorghum vulgare*), shibamugi (quackgrass; *Agropyron repens*), nezumimugi (Italian ryegrass; *Lolium multiflorum*), hosomugi (perennial ryegrass; *Lolium perenne*), bomugi (rigid ryegrass; *Lolium rigidum*), karasunochahiki (cheat; *Bromus secalinus*), umanochahiki (downy brome; *Bromus tectorum*), hosonogemugi (foxtail barley; *Hordeum jubatum*), yagimugi (jointed goatgrass; *Aegilops cylindrica*), kusayoshi (reed canarygrass; *Phalaris arundinacea*), himekanarikusayoshi (little-seed canary grass; *Phalaris minor*), silky bentgrass (*Apera spica-venti*), okusakibi (fall *panicum; Panicum dichotomiflorum*), Texas panicum (*Panicum texanum*), gineakibi (guineagrass; *Panicum maximum*), merikennikukibi (broadleaf signalgrass; *Brachiaria platyphylla*), rujigurasu (Congo signal grass; *Brachiaria ruziziensis*), Alexander grass (*Brachiaria plantaginea*), Surinam grass (*Brachiaria decumbens*), palisade grass (*Brachiaria brizantha*), koronibiagurasu (creeping signalgrass; *Brachiaria humidicola*), shinkurinoiga (southern sandbur; *Cenchrus echinatus*), himekurinoiga (field sandbur; *Cenchrus pauciflorus*), narukobie (woolly cupgrass; *Eriochloa villosa*), penisetamu (feathery *pennisetum; Pennisetum setosum*), afurikahigeshiba (Rhodes grass; *Chloris gayana*), oniwahokori (India lovegrass; *Eragrostis pilosa*), rubigaya (Natal grass; *Rhynchelytrum repens*), tatsunotsumegaya (crowfoot grass; *Dactyloctenium aegyptium*), taiwanaiashi (winkle grass; *Ischaemum rugosum*), yaseiine (common rice; *Oryza sativa*), amerikasuzumenohie (bahiagrass; *Paspalum notatum*), coastal sand *paspalum* (*Paspalum maritimum*), kikuyugrass (*Pennisetum clandestinum*), hosobachikarashiba (West Indies *pennisetum*; *Pennisetum setosum*), tsunoaiashi (itch grass; *Rottboellia cochinchinensis*)

Cyperaceae weeds: kayatsurigusa (Asian flatsedge; *Cyperus microiria*), kogomegayatsuri (rice flatsedge; *Cyperus iria*), kingayatsuri (fragrant flatsedge; *Cyperus odoratus*), hamasuge (purple nutsedge; *Cyperus rotundas*), kihamasuge (yellow nutsedge; *Cyperus esculentus*), himekugu (pasture spike sedge; *Kyllinga gracillima*)

Equisetaceae weeds: sugina (field horsetail; *Equisetum arvense*), inusugina (marsh horsetail; *Equisetum palustre*), etc.

In the above weeds, mutations within the species are not particularly limited. Namely, the weeds also include any weeds that have a reduced sensitivity to a specific herbicide. The reduced sensitivity may be attributed to a mutation at a target site (target site mutations), or may be attributed to any factors other than target site mutation (non-target site mutations). The factors reducing sensitivity by non-target site mutations include metabolic enhancement, defective absorption, defective transition, and efflux out of the system, etc. A cause of the metabolic enhancement includes an enhanced activity of metabolic enzymes such as cytochrome P450 monooxygenases, aryl acylamidases, esterases and glutathione S-transferase. The efflux out of the system includes the transfer to a vacuole by an ABC transporter. Examples of the reduced sensitivity in weeds caused by the target site mutations include, for example, weeds having one or more of the following amino acid substitutions in the ALS gene: Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu, Gly645Asp. Also, examples of the reduced sensitivity in weeds caused by the target site mutations include one or more of the following amino acid substitutions in the ACCase gene: Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg, Gly2096Ala, Gly2096Ser. Further, examples of the reduced sensitivity in weeds caused by the target site mutations include ΔGly210 in the PPX2L gene and Arg98Leu mutation in the PPX1 gene. In particular, the present invention can efficiently control PPO inhibitor-resistant hiyumodoki (tall waterhemp; *Amaranthus tuberculatos*) and PPO inhibitor-resistant ohonagaaogeito (Palmer amaranth; *Amaranthus palmeri*) which has ΔGly210 mutation in the PPX2L gene and PPO inhibitor-resistant butakusa (common ragweed; *Ambrosia artemisiaefolia*) which has Arg98Leu in the PPX1 gene. Moreover, examples of the reduced sensitivity in weeds caused by the target site mutations include amino acid substitutions such as Thr102Ile, Pro106Ser, Pro106Ala and Pro106Leu in the EPSP gene. In particular, the present invention can efficiently control glyphosate-resistant ohishiba (goosegrass; *Eleusine indica*), glyphosate-resistant nezumimugi (Italian ryegrass; *Lolium multiflorum*), glyphosate-resistant bomugi (rigid ryegrass; *Lolium rigidum*), glyphosate-resistant susukimehishiba (sourgrass; *Digitaria insularis*), glyphosate-resistant hiyumodoki (tall waterhemp; *Amaranthus tuberculatos*), and glyphosate-resistant kohimebie (jungle rice; *Echinochloa colonum*) which have one or both of the amino acid substitutions. Similarly, examples of the reduced sensitivity in weeds caused by the target site include weeds having the increased copy numbers of EPSP gene, and in particular, the present invention can efficiently control glyphosate-resistant ohonagaaogeito (Palmer amaranth; *Amaranthus palmeri*), glyphosate-resistant hiyumodoki (tall waterhemp; *Amaranthus tuberculatos*) and glyphosate-resistant hokigi (*kochia; Kochia scoparia*) which have the mutation. The present invention can also efficiently control himemukashiyomogi (marestail; *Conyza canadensis*), oarechinogiku (Guernsey fleabane; *Conyza sumatrensis*) and arechinogiku (fleabane; *Conyza bonariensis*) having the resistance to glyphosate related to ABC transporters.

Examples of the herbicide which may be incorporated to the present composition besides the compound X and dicamba salt include the following. The herbicides can be used by mixing with the present composition containing as an active ingredient only the compound X and dicamba salt.

Herbicide: glyphosate and its salt (isopropylammonium salt, ammonium salt, potassium salt, guanidine salt, dimethylamine salt, monoethanolamine salt, choline salt, BAPMA (N,N-bis-(aminopropyl)methylamine) salt, 2,4-D and its salt or ester (ammonium salt, butotyl ester, 2-butoxypropyl ester, butyl ester, diethylammonium salt, dimethylammonium salt, diolamine salt, dodecylammonium salt, ethyl ester, 2-ethylhexyl ester, heptylammonium salt, isobutyl ester, isoctyl ester, isopropyl ester, isopropylammonium salt, lithium salt, meptyl ester, methyl ester, octyl ester, pentyl ester, propyl ester, sodium salt, tefuryl ester, tetradecylammonium salt, triethylammonium salt, tris(2-hydroxypropyl)ammonium salt, trolamine salt, choline salt), 2,4-DB and its salt or ester (dimethylammonium salt, isoctyl ester, choline salt), pyroxasulfone, MCPA and its salt or ester (dimethylammonium salt, 2-ethylhexyl ester, isoctyl ester, sodium salt, choline salt), MCPB, mecoprop and its salt or ester (dimethylammonium salt, diolamine salt, ethadyl ester, 2-ethylhexyl ester, isoctyl ester, methyl ester, potassium salt, sodium salt, trolamine salt, choline salt), mecoprop-P and its salt or ester (dimethylammonium salt, 2-ethylhexyl ester, isobutyl salt, potassium salt, choline salt), dichlorprop and its salt or ester (butotyl ester, dimethylammonium salt, 2-ethylhexyl ester, isoctyl ester, methyl ester, potassium salt, sodium salt, choline salt), dichlorprop-P, dichlorprop-P-dimethylammonium salt, quinclorac, quinmerac, bromoxynil, bromoxynil-octanoate, dichlobenil, methiozolin, ioxynil, ioxynil-octanoate, di-allate, butylate, tri-allate, phenmedipham, chlorpropham, desmedipham, asulam, phenisopham, benthiocarb, molinate, esprocarb, pyributicarb, prosulfocarb, orbencarb, EPIC, dimepiperate, swep, propachlor, metazachlor, alachlor, acetochlor, metolachlor, S-metolachlor, butachlor, pretilachlor, thenylchlor, aminocyclopyrachlor, aminocyclopyrachlor-methyl, aminocyclopyrachlor-potassium, trifluralin, pendimethalin, ethalfluralin, benfluralin, prodiamine, simazine, atrazine, propazine, cyanazine, ametryn, simetryn, dimethametryn, prometryn, indaziflam, triaziflam, metribuzin, hexazinone, terbumeton, terbuthylazine, terbutryn, trietazine, isoxaben, diflufenican, diuron, linuron, metobromuron, metoxuron, monolinuron, siduron, fluometuron, difenoxuron, methyl-daimuron, isoproturon, isouron, tebuthiuron, benzthiazuron, methabenzthiazuron, propanil, mefenacet, clomeprop, naproanilide, bromobutide, daimuron, cumyluron, diflufenzopyr, etobenzanid, bentazon, tridiphane, indanofan, amitrole, fenchlorazole, clomazone, maleic hydrazide, pyridate, chloridazon, norflurazon, bromacil, terbacil, lenacil, oxaziclomefone, cinmethylin, benfuresate, cafenstrole, flufenacet, pyrithiobac, pyrithiobac-sodium salt, pyriminobac, pyriminobac-methyl, bispyribac, bispyribac-sodium salt, pyribenzoxim, pyrimisulfan, pyriftalid, triafamone, fentrazamide, dimethenamid, dimethenamid-P, ACN, dithiopyr, triclopyr and its salt or ester (butotyl ester, triethylammonium salt), fluroxypyr, fluroxypyr-meptyl, thiazopyr, aminopyralid and its salt (potassium salt, triisopropanolammonium salt, choline salt), clopyralid and its salt (olamine salt, potassium salt, triethylammonium salt, choline salt), picloram and its salt (potassium salt, triisopropanolammonium salt, choline salt), dalapon, chlorthiamid, amidosulfuron, azimsulfuron, bensulfuron, bensulfuron-methyl, chlorimuron, chlorimuron-ethyl, cyclosulfamuron, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, mesosulfuron, mesosulfuron-methyl, metazosulfuron, nicosulfuron, orthosulfamuron, oxasulfuron, primisulfuron, primisulfuron-methyl, propyrisulfuron, pyrazosulfuron, pyrazosulfuron-ethyl, rimsulfuron, sulfometuron, sulfometuron-methyl, sulfosulfuron, trifloxysulfuron-sodium salt, trifloxysulfuron, chlorsulfuron, cinosulfuron, ethametsulfuron, ethametsulfuron-methyl, iodosulfuron, iodosulfuron-methyl-sodium, iofensulfuron, iofensulfuron-sodium, metsulfuron, metsulfuron-methyl, prosulfuron, thifensulfuron, thifensulfuron-methyl, triasulfuron, tribenuron, tribenuron-methyl, triflusulfuron, triflusulfuron-methyl, tritosulfuron, picolinafen, beflubutamid, norflurazon, fluridone, flurochloridone, flurtamone, benzobicyclon, bicyclopyrone, mesotrione, sulcotrione, tefuryltrione, tembotrione, isoxachlortole, isoxaflutole, benzofenap, pyrasulfotole, pyrazolynate, pyrazoxyfen, topramezone, tolpyralate, lancotrione-sodium salt, flupoxam, amicarbazone, bencarbazone, flucarbazone, flucarbazone-sodium salt, ipfencarbazone, propoxycarbazone, propoxycarbazone-sodium salt, thiencarbazone, thiencarbazone-methyl, cloransulam, cloransulam-methyl, diclosulam, florasulam, flumetsulam, metosulam, penoxsulam, pyroxsulam, imazamethabenz, imazamethabenz-methyl, imazamox, imazamox-ammonium salt, imazapic, imazapic-ammonium salt, imazapyr, imazapyr-ammonium salt, imazaquin, imazaquin-ammonium salt, imazethapyr, imazethapyr-ammonium salt, clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, propaquizafop, quizalofop, quizalofop-ethyl, quizalofop-P, quizalofop-P-ethyl, alloxydim, clethodim, sethoxydim, tepraloxydim, tralkoxydim, pinoxaden, fenoxasulfone, glufosinate, glufosinate-ammonium salt, glufosinate-P, glufosinate-P-sodium salt, bialafos, anilofos, bensulide, butamifos, paraquat, paraquat-dichloride, diquat, diquat-dibromide, halauxifen, halauxifen-methyl, florpyrauxifen, florpyrauxifen-benzyl, flumioxazin, flumiclorac-pentyl, fomesafen-sodium salt, lactofen, saflufenacil, tiafenacil, trifludimoxazin, acifluorfen-sodium salt, aclonifen, bifenox, chlomethoxyfen, chlornitrofen, ethoxyfenethyl, fluorodifen, fluoroglycofen-ethyl, fluoronitrofen, halosafen, nitrofen, nitrofluorfen, oxyfluorfen, cinidon-ethyl, profluazol, pyraclonil, oxadiargyl, oxadiazone, pentoxazone, fluazolate, pyraflufen-ethyl, benzfendizone, butafenacil, fluthiacet-methyl, thidiazimin, azafenidin, carfentrazone-ethyl, sulfentrazone, and flufenpyr-ethyl.

As the herbicide which can be used together with the present composition in the present invention, glyphosate potassium salt, glyphosate guanidine salt, glyphosate dimethylamine salt, glyphosate monoethanolamine salt, glufosinate ammonium salt, glyphosate isopropyl ammonium salt, 2,4-D choline salt, pyroxasulfone, flumioxazin, flumiclorac-pentyl, clethodim, lactofen, S-metolachlor, metribuzin, flufenacet, nicosulfuron, rimsulfuron, acetochlor, mesotrione, isoxaflutole, chlorimuron-ethyl, thifensulfuron-methyl, cloransulam-methyl, imazethapyr-ammonium salt are particularly preferable.

Examples of a combination of the compound X and dicamba salt with the herbicide which can be used together with the compound X and dicamba salt in the present invention (hereinafter, also referred to as "herbicide Z") are recited as follows, but are not limited thereto. A ratio of the herbicide Z to the compound X is usually within the range of 0.01 to 1000 times by weight, preferably 0.1 to 300 times by weight. Examples of a weight ratio of the compound X, dicamba salt and the herbicide Z are described as follows.

[compound X/dicamba diglycolamine salt/glyphosate potassium salt=1/28/50], [compound X/dicamba diglycolamine salt/glyphosate potassium salt=1/56/80], [compound X/dicamba diglycolamine salt/glyfosate guanidine salt=1/28/50], [compound X/dicamba diglycolamine salt/glyphosate guanidine salt=1/56/100], [compound X/dicamba diglycolamine salt/glyphosate dimethylamine salt=1/28/50], [compound X/dicamba diglycolamine salt/glyphosate dimethylamine salt=1/56/100], [compound X/dicamba diglycolamine salt/glyphosate monoethanolamine salt=1/28/50], [compound X/dicamba diglycolamine salt/glyphosate monoethanolamine salt=1/56/100], [compound X/dicamba diglycolamine salt/glyphosate isopropylamine salt=1/28/50], [compound X/dicamba diglycolamine salt/glyphosate isopropylamine salt=1/56/100], [compound X/dicamba diglycolamine salt/glufosinate ammonium salt=1/28/30], [compound X/dicamba diglycolamine salt/glufosinate ammonium salt=1/56/60], [compound X/dicamba diglycolamine salt/2,4-D choline salt=1/28/50], [compound X/dicamba diglycolamine salt/2,4-D choline salt=1/56/100], [compound X/dicamba diglycolamine salt/pyroxasulfone=1/28/6], [compound X/dicamba diglycolamine salt/pyroxasulfone=1/56/12], [compound X/dicamba diglycolamine salt/flumioxazin=1/28/3.5], [compound X/dicamba diglycolamine salt/flumioxazin=1/56/7], [compound X/dicamba diglycolamine salt/flumioxazin/chlorimuron-ethyl=1/28/3.5/1.1], [compound X/dicamba diglycolamine salt/flumioxazin/chlorimuron-ethyl=1/56/7/2.2], [compound X/dicamba diglycolamine salt/flumioxazin/chlorimuron-ethyl/thifensulfuron-methyl=1/28/3.5/1.1/0.9], [compound X/dicamba diglycolamine salt/flumioxazin/chlorimuron-ethyl/thifensulfuron-methyl=1/56/7/2.2/1.7], [compound X/dicamba diglycolamine salt/flumioxazin/cloransulam-methyl=1/28/3.5/1.5], [compound X/dicamba diglycolamine salt/flumioxazin/cloransulam-methyl=1/56/7/3], [compound X/dicamba diglycolamine salt/flumioxazin/metribuzin/chlorimuron-ethyl=1/28/3.5/11/1.1], [compound X/dicamba diglycolamine salt/flumioxazin/metribuzin/chlorimuron-ethyl=1/56/7/22/2.2], [compound X/dicamba diglycolamine salt/flumioxazin/metribuzin/imazethapyr ammonium salt=1/28/3.5/11/3.5], [compound X/dicamba diglycolamine salt/flumioxazin/metribuzin/imazethapyr ammonium salt=1/56/7/22/7], [compound X/dicamba diglycolamine salt/flumiclorac-pentyl=1/28/1.5], [compound X/dicamba diglycolamine salt/flumiclorac-pentyl=1/56/3], [compound X/dicamba diglycolamine salt/clethodim=1/28/3], [compound X/dicamba diglycolamine salt/clethodim=1/56/6], [compound X/dicamba diglycolamine salt/lactofen=1/28/11], [compound X/dicamba diglycolamine salt/lactofen=1/56/22], [compound X/dicamba diglycolamine salt/S-metolachlor=1/28/80], [compound X/dicamba diglycolamine salt/S-metolachlor=1/56/160], [compound X/dicamba diglycolamine salt/metribuzin=1/28/11], [compound X/dicamba diglycolamine salt/metribuzin=1/56/22], [compound X/dicamba diglycolamine salt/flufenacet=1/28/25], [compound X/dicamba diglycolamine salt/flufenacet=1/56/50], [compound X/dicamba diglycolamine salt/nicosulfuron=1/28/1.8], [compound X/dicamba diglycolamine salt/nicosulfuron=1/56/3.5], [compound X/dicamba diglycolamine salt/rimsulfuron=1/28/0.9], [compound X/dicamba diglycolamine salt/rimsulfuron=1/56/1.7], [compound X/dicamba diglycolamine salt/acetochlor=1/28/80], [compound X/dicamba diglycolamine salt/acetochlor=1/56/150], [compound X/dicamba diglycolamine salt/mesotrione=1/28/5], [compound X/dicamba diglycolamine salt/mesotrione=1/56/10.5], [compound X/dicamba diglycolamine salt/isoxaflutole=1/28/3.5], [compound X/dicamba diglycolamine salt/isoxaflutole=1/56/7], [compound X/dicamba diglycolamine salt/chlorimuron-ethyl=1/28/1.1], [compound X/dicamba diglycolamine salt/chlorimuron-ethyl=1/56/2.2], [compound X/dicamba diglycolamine salt/thifensulfuron-methyl=1/28/0.9], [compound X/dicamba diglycolamine salt/thifensulfuron-methyl=1/56/1.7], [compound X/dicamba diglycolamine salt/cloransulam-methyl=1/28/1.5], [compound X/dicamba diglycolamine salt/cloransulam-methyl=1/56/3], [compound X/dicamba diglycolamine salt/imazethapyr ammonium salt=1/28/3.5], [compound X/dicamba diglycolamine salt/imazethapyr ammonium salt=1/56/7], [compound X/dicamba diglycolamine salt/glyphosate potassium salt/2,4-D choline salt=1/28/50/50], [compound X/dicamba diglycolamine salt/glyphosate potassium salt/2,4-D choline salt=1/56/80/100], [compound X/dicamba diglycolamine salt/glyphosate dimethylamine salt/2,4-D choline salt=1/28/50/50], [compound X/dicamba diglycolamine salt/glyphosate dimethylamine salt/2,4-D choline salt=1/56/100/100], [compound X/dicamba diglycolamine salt/glyphosate potassium salt/pyroxasulfone=1/28/50/6], [compound X/dicamba diglycolamine salt/glyphosate potassium salt/pyroxasulfone=1/56/80/12], [compound X/dicamba diglycolamine salt/glyphosate potassium salt/flumioxazin=1/28/50/3.5], [compound X/dicamba diglycolamine salt/glyphosate potassium salt/flumioxazin=1/56/80/7], [compound X/dicamba diglycolamine salt/glyphosate potassium salt/flumioxazin/chlorimuron-ethyl=1/28/50/3.5/1.1], [compound X/dicamba diglycolamine salt/glyphosate potassium salt/flumioxazin/chlorimuron-ethyl=1/56/80/7/2.2], [compound X/dicamba diglycolamine salt/glyphosate potassium salt/flumioxazin/chlorimuron-ethyl/thifensulfuron-methyl=1/28/50/3.5/1.1/0.9], [compound X/dicamba diglycolamine salt/glyphosate potassium salt/flumioxazin/chlorimuron-ethyl/thifensulfuron-methyl=1/56/80/7/2.2/1.7], [compound X/dicamba diglycolamine salt/glyphosate potassium salt/flumioxazin/cloransulam-methyl=1/28/50/3.5/1.5], [compound X/dicamba diglycolamine salt/glyphosate potassium salt/flumioxazin/cloransulam-methyl=1/56/80/7/3], [compound X/dicamba diglycolamine salt/glyphosate potassium salt/flumioxazin/metribuzin/chlorimuron-ethyl=1/28/50/3.5/11/1.1], [compound X/dicamba diglycolamine salt/glyphosate potassium salt/flumioxazin/metribuzin/chlorimuron-ethyl=1/56/80/7/22/2.2], [compound X/dicamba diglycolamine salt/glyphosate potassium salt/flumioxazin/metribuzin/imazethapyr ammonium salt=1/28/50/3.5/11/3.5], [compound X/dicamba diglycolamine salt/glyphosate potassium salt/flumioxazin/metribuzin/imazethapyr ammonium salt=1/56/80/7/22/7], [compound X/dicamba diglycolamine salt/glyphosate potassium salt/flumiclorac-pentyl=1/28/50/1.5], [compound X/dicamba diglycolamine salt/glyphosate potassium salt/flumiclorac-pentyl=1/56/80/3], [compound X/dicamba diglycolamine salt/glyphosate potassium salt/clethodim=1/28/50/3], [compound X/dicamba diglycolamine salt/glyphosate potassium salt/clethodim=1/56/80/6], [compound X/dicamba diglycolamine salt/glyphosate potassium salt/lactofen 1/28/50/11], [compound X/dicamba diglycolamine salt/glyphosate potassium salt/lactofen=1/56/80/22], [compound X/dicamba diglycolamine salt/glyphosate potassium salt/S-metolachlor=1/28/50/80], [compound X/dicamba diglycolamine salt/glyphosate potassium salt/S-metolachlor=1/56/80/160], [compound X/dicamba diglycolamine salt/glyphosate potassium salt/metribuzin=1/28/50/11], [compound X/dicamba diglycolamine salt/glyphosate potassium salt/metribuzin=1/56/80/22], [compound X/dicamba diglycolamine salt/glyphosate potassium salt/flufenacet=1/28/50/25], [compound X/dicamba diglycolamine salt/glyphosate potassium salt/flufenacet=1/56/80/50], [compound X/dicamba diglycolamine salt/glyphosate potassium salt/nicosulfuron=1/28/50/1.8], [compound X/dicamba diglycolamine salt/glyphosate potassium/nicosulfuron=1/56/80/3.5], [compound X/dicamba diglycolamine salt/glyphosate potassium salt/rimsulfuron=1/28/50/0.9], [compound X/dicamba diglycolamine salt/glyphosate potassium salt/rimsulfuron=1/56/80/1.7], [compound X/dicamba diglycolamine salt/glyphosate potassium salt/acetochlor=1/28/50/80], [compound X/dicamba diglycolamine salt/glyphosate potassium salt/acetochlor=1/56/80/150], [compound X/dicamba diglycolamine salt/glyphosate potassium salt/mesotrione=1/28/50/5], [compound X/dicamba diglycolamine salt/glyphosate potassium salt/mesotrione=1/56/80/10.5], [compound X/dicamba diglycolamine salt/glyphosate potassium salt/isoxaflutole=1/28/50/3.5], [compound X/dicamba diglycolamine salt/glyphosate potassium salt/isoxaflutole=1/56/80/7], [compound X/dicamba diglycolamine salt/glyphosate potassium salt/chlorimuron-ethyl=1/28/50/1.1], [compound X/dicamba diglycolamine salt/glyphosate potassium salt/chlorimuron-ethyl=1/56/80/2.2], [compound X/dicamba diglycolamine salt/glyphosate potassium salt/thifensulfuron-methyl=1/28/50/0.9], [compound X/dicamba diglycolamine salt/glyphosate potassium salt/thifensulfuron-methyl=1/56/80/1.7], [compound X/dicamba diglycolamine salt/glyphosate potassium salt/cloransulam-methyl=1/28/50/1.5], [compound X/dicamba diglycolamine salt/glyphosate potassium salt/cloransulam-methyl=1/56/80/3], [compound X/dicamba diglycolamine salt/glyphosate potassium salt/imazethapyr ammonium salt=1/28/50/3.5], [compound X/dicamba diglycolamine salt/glyphosate potassium salt/imazethapyr ammonium salt=1/56/80/7],

[compound X/dicamba BAPMA salt/glyphosate potassium salt=1/28/50], [compound X/dicamba BAPMA salt/glyphosate potassium salt=1/56/80], [compound X/dicamba BAPMA salt/glyphosate guanidine salt=1/28/50], [compound X/dicamba BAPMA salt/glyphosate guanidine salt=1/56/100], [compound X/dicamba BAPMA salt/glyphosate dimethylamine salt=1/28/50], [compound X/dicamba BAPMA salt/glyphosate dimethylamine salt=1/56/100], [compound X/dicamba BAPMA salt/glyphosate monoethanolamine salt=1/28/50], [compound X/dicamba BAPMA salt/glyphosate monoethanolamine salt=1/56/100], [compound X/dicamba BAPMA salt/glyphosate isopropylamine salt=1/28/50], [compound X/dicamba BAPMA salt/glyphosate isopropylamine salt=1/56/100], [compound X/dicamba BAPMA salt/glufosinate ammonium salt=1/28/30], [compound X/dicamba BAPMA salt/glufosinate ammonium salt=1/56/60], [compound X/dicamba BAPMA salt/2,4-D choline salt=1/28/50], [compound X/dicamba BAPMA salt/2,4-D choline salt=1/56/100], [compound X/dicamba BAPMA salt/pyroxasulfone=1/28/6], [compound X/dicamba BAPMA salt/pyroxasulfone=1/56/12], [compound X/dicamba BAPMA salt/flumioxazin=1/28/3.5], [compound X/dicamba BAPMA salt/flumioxazin=1/56/7], [compound X/dicamba BAPMA salt/flumioxazin/chlorimuron-ethyl=1/28/3.5/1.1], [compound X/dicamba BAPMA salt/flumioxazin/chlorimuron-ethyl=1/56/7/2.2], [compound X/dicamba BAPMA salt/flumioxazin/chlorimuron-ethyl/thifensulfuron-methyl=1/28/3.5/1.1/0.9], [compound X/dicamba BAPMA salt/flumioxazin/chlorimuron-ethyl/thifensulfuron-methyl=1/56/7/2.2/1.7], [compound X/dicamba BAPMA salt/flumioxazin/cloransulam-methyl=1/28/3.5/1.5], [compound X/dicamba BAPMA salt/flumioxazin/cloransulam-methyl=1/56/7/3], [compound X/dicamba BAPMA salt/flumioxazin/metribuzin/chlorimuron-ethyl=1/28/3.5/11/1.1], [compound X/dicamba BAPMA salt/flumioxazin/metribuzin/chlorimuron-ethyl=1/56/7/22/2.2], [compound X/dicamba BAPMA salt/flumioxazin/metribuzin/imazethapyr ammonium salt=1/28/3.5/11/3.5], [compound X/dicamba BAPMA salt/flumioxazin/metribuzin/imazethapyr ammonium salt=1/56/7/22/7], [compound X/dicamba BAPMA salt/flumiclorac-pentyl=1/28/1.5], [compound X/dicamba BAPMA salt/flumiclorac-pentyl=1/56/3], [compound X/dicamba BAPMA salt/clethodim=1/28/3], [compound X/dicamba BAPMA salt/clethodim=1/56/6], [compound X/dicamba BAPMA salt/lactofen=1/28/11], [compound X/dicamba BAPMA salt/lactofen=1/56/22], [compound X/dicamba BAPMA salt/S-metolachlor=1/28/80], [compound X/dicamba BAPMA salt/S-metolachlor=1/56/160], [compound X/dicamba BAPMA salt/metribuzin=1/28/11], [compound X/dicamba BAPMA salt/metribuzin=1/56/22], [compound X/dicamba BAPMA salt/flufenacet=1/28/25], [compound X/dicamba BAPMA salt/flufenacet=1/56/50], [compound X/dicamba BAPMA salt/nicosulfuron=1/28/1.8], [compound X/dicamba BAPMA salt/nicosulfuron=1/56/3.5], [compound X/dicamba BAPMA salt/rimsulfuron=1/28/0.9], [compound X/dicamba BAPMA salt/rimsulfuron=1/56/1.7], [compound X/dicamba BAPMA salt/acetochlor=1/28/80], [compound X/dicamba BAPMA salt/acetochlor=1/56/150], [compound X/dicamba BAPMA salt/mesotrione=1/28/5], [compound X/dicamba BAPMA salt/mesotrione=1/56/10.5], [compound X/dicamba BAPMA salt/isoxaflutole=1/28/3.5], [compound X/dicamba BAPMA salt/isoxaflutole=1/56/7], [compound X/dicamba BAPMA salt/chlorimuron-ethyl=1/28/1.1], [compound X/dicamba BAPMA salt/chlorimuron-ethyl=1/56/2.2], [compound X/dicamba BAPMA salt/thifensulfuron-methyl=1/28/0.9], [compound X/dicamba BAPMA salt/thifensulfuron-methyl=1/56/1.7], [compound X/dicamba BAPMA salt/cloransulam-methyl=1/28/1.5], [compound X/dicamba BAPMA salt/cloransulam-methyl=1/56/3], [compound X/dicamba BAPMA salt/imazethapyr ammonium salt=1/28/3.5], [compound X/dicamba BAPMA salt/imazethapyr ammonium salt=1/56/7], [compound X/dicamba BAPMA salt/glyphosate potassium salt/2,4-D choline salt=1/28/50/50], [compound X/dicamba BAPMA salt/glyphosate potassium salt/2,4-D choline salt=1/56/80/100], [compound X/dicamba BAPMA salt/glyphosate dimethylamine salt/2,4-D choline salt=1/28/50/50], [compound X/dicamba BAPMA salt/glyphosate dimethylamine salt/2,4-D choline salt=1/56/100/100], [compound X/dicamba BAPMA salt/glyphosate potassium salt/pyroxasulfone=1/28/50/6], [compound X/dicamba BAPMA salt/glyphosate potassium salt/pyroxasulfone=1/56/80/12], [compound X/dicamba BAPMA salt/glyphosate potassium salt/flumioxazin=1/28/50/3.5], [compound X/dicamba BAPMA salt/glyphosate potassium salt/flumioxazin=1/56/80/7], [compound X/dicamba BAPMA salt/glyphosate potassium salt/flumioxazin/chlorimuron-ethyl=1/28/50/3.5/1.1], [compound X/dicamba BAPMA salt/glyphosate potassium salt/flumioxazin/chlorimuron-ethyl=1/56/80/7/2.2], [compound X/dicamba BAPMA salt/glyphosate potassium salt/flumioxazin/chlorimuron-ethyl/thifensulfuron-methyl=1/28/50/3.5/1.1/0.9], [compound X/dicamba BAPMA salt/glyphosate potassium salt/flumioxazin/chlorimuron-ethyl/thifensulfuron-methyl=1/56/80/7/2.2/1.7], [compound X/dicamba BAPMA salt/glyphosate potassium salt/flumioxazin/cloransulam-methyl=1/28/50/3.5/1.5], [compound X/dicamba BAPMA salt/glyphosate potassium salt/flumioxazin/cloransulam-methyl=1/56/80/7/3], [compound X/dicamba BAPMA salt/glyphosate potassium salt/flumioxazin/metribuzin/chlorimuron-ethyl=1/28/50/3.5/11/1.1], [compound X/dicamba BAPMA salt/glyphosate potassium salt/flumioxazin/metribuzin/chlorimuron-ethyl=1/56/80/7/22/2.2], [compound X/dicamba BAPMA salt/glyphosate potassium salt/flumioxazin/metribuzin/imazethapyr ammonium salt=1/28/50/3.5/11/3.5], [compound X/dicamba BAPMA salt/glyphosate potassium salt/flumioxazin/metribuzin/imazethapyr ammonium salt=1/56/80/7/22/7], [compound X/dicamba BAPMA salt/glyphosate potassium salt/flumiclorac-pentyl=1/28/50/1.5], [compound X/dicamba BAPMA salt/glyphosate potassium salt/flumiclorac-pentyl=1/56/80/3], [compound X/dicamba BAPMA salt/glyphosate potassium salt/clethodim=1/28/50/3], [compound X/dicamba BAPMA salt/glyphosate potassium salt/clethodim=1/56/80/6], [compound X/dicamba BAPMA salt/glyphosate potassium salt/lactofen=1/28/50/11], [compound X/dicamba BAPMA salt/glyphosate potassium salt/lactofen=1/56/80/22], [compound X/dicamba BAPMA salt/glyphosate potassium salt/S-metolachlor=1/28/50/80], [compound X/dicamba BAPMA salt/glyphosate potassium salt/S-metolachlor=1/56/80/160], [compound X/dicamba BAPMA salt/glyphosate potassium salt/metribuzin=1/28/50/11], [compound X/dicamba BAPMA salt/glyphosate potassium salt/metribuzin=1/56/80/22], [compound X/dicamba BAPMA salt/glyphosate potassium salt/flufenacet=1/28/50/25], [compound X/dicamba BAPMA salt/glyphosate potassium salt/flufenacet=1/56/80/50], [compound X/dicamba BAPMA salt/glyphosate potassium salt/nicosulfuron=1/28/50/1.8], [compound X/dicamba BAPMA salt/glyphosate potassium salt/nicosulfuron=1/56/80/3.5], [compound X/dicamba BAPMA salt/glyphosate potassium salt/rimsulfuron=1/28/50/0.9], [compound X/dicamba BAPMA salt/glyphosate potassium salt/rimsulfuron=1/56/80/1.7], [compound X/dicamba BAPMA salt/glyphosate potassium salt/acetochlor=1/28/50/80], [compound X/dicamba BAPMA salt/glyphosate potassium salt/acetochlor=1/56/80/150], [compound X/dicamba BAPMA salt/glyphosate potassium salt/mesotrione=1/28/50/5], [compound X/dicamba BAPMA salt/glyphosate potassium salt/mesotrione=1/56/80/10.5], [compound X/dicamba BAPMA salt/glyphosate potassium salt/isoxaflutole=1/28/50/3.5], [compound X/dicamba BAPMA salt/glyphosate potassium salt/isoxaflutole=1/56/80/7], [compound X/dicamba BAPMA salt/glyphosate potassium salt/chlorimuron-ethyl=1/28/50/1.1], [compound X/dicamba BAPMA salt/glyphosate potassium salt/chlorimuron-ethyl=1/56/80/2.2], [compound X/dicamba BAPMA salt/glyphosate potassium salt/thifensulfuron-methyl=1/28/50/0.9], [compound X/dicamba BAPMA salt/glyphosate potassium salt/thifensulfuron-methyl=1/56/80/1.7], [compound X/dicamba BAPMA salt/glyphosate potassium salt/cloransulam-methyl=1/28/50/1.5], [compound X/dicamba BAPMA salt/glyphosate potassium salt/ cloransulam-methyl=1/56/80/3], [compound X/dicamba BAPMA salt/glyphosate potassium salt/imazethapyr ammonium salt=1/28/50/3.5], [compound X/dicamba BAPMA salt/glyphosate potassium salt/imazethapyr ammonium salt=1/56/80/7].

More preferred specific combinations of the cases when the present composition is used together with one or more herbicides are the present composition+glyphosate potassium salt, and the present composition+glyphosate monoethanolamine salt.

The cultivation of crops in the present invention can be managed according to the plant-nutrition in the common crop cultivation. The fertilization system may be based on Precision Agriculture or may be conventionally uniform one.

EXAMPLES

The present invention is described by Examples, but the present invention should not be limited thereto.

Firstly, the criteria for assessing each of an efficacy on controlling harmful arthropods, an efficacy on controlling plant pathogens, a herbicidal efficacy and a crop injury, which are shown in the below examples, are shown.

[Efficacy on Controlling Harmful Arthropods]

In the assessment of efficacy on controlling harmful arthropods, the life and death of insects at the time of the investigation is determined and the controlling value is calculated by the following equation.

$$\text{Controlling value (\%)} = 100 \times (1 - T/C)$$

wherein the characters in the equation represent the following meanings.

C: Number of insects at the time of the observation in untreated area

T: Number of insects at the time of the observation in treated area

[Efficacy on Controlling Plant Pathogens]

In the assessment of efficacy on controlling plant pathogens, the efficacy is defined as "0" if the disease symptom by plant pathogens indicates little or no difference compared to that in the case of no treatment at the time of the investigation. The efficacy is defined as "100" if the disease symptom by plant pathogens is little or not observed. Hence, the efficacy is classified as "0 to 100".

[Herbicidal Efficacy and Crop Injury]

In the assessment of herbicidal efficacy, the efficacy is defined as "0" if the state of budding or growth of test weeds indicates little or no difference compared to that in the case of no treatment at the time of the investigation. The efficacy is defined as "100" if test weeds are completely dead or the budding or growth of test weeds is completely prevented. Hence, the efficacy is classified as "0 to 100".

In the assessment of crop injuries, the injury is defined as "harmless" if a minimal harmful effect is observed. The injury is defined as "small" if a mild harmful effect is observed. The injury is defined as "medium" if a moderate harmful effect is observed. The injury is defined as "large" if a severe harmful effect is observed.

Example 1

The weeds (ohonagaaogeito (Palmer amaranth; *Amaranthus palmeri*), hosobainubiyu (common waterhemp; *Amaranthus rudis*), butakusa (common ragweed; *Ambrosia artemisiaefolia*), obutakusa (giant ragweed; *Ambrosia trifida*), himemukashiyomogi (marestail; *Conyza canadensis*), shiroza (common lambsquarters; *Chenopodium album*), hokigi (*kochia*; *Kochia scoparia*), inubie (common barnyardgrass; *Echinochloa crus-galli*), and akinoenokorogusa (giant foxtail; *Setaria faberi*)) are seeded to a plastic pot. On the same day, 20 g/ha of the compound X and 1169 mL/ha (1 pint/acre) of CLARITY® (dicamba diglycolamine salt 480 g/L, manufactured by BASF Corp.) are applied to the surface of soil at the sprayed water amount of 200 L/ha. The plants are then cultivated in a greenhouse, and at seven days after the application, soybeans are seeded. Fourteen days after seeding the soybeans, the effects on the weeds and crop injuries on the soybeans are investigated. A synergistic weed control effect compared to the single use of each of the compounds is confirmed.

Example 2

The weeds (ohonagaaogeito (Palmer amaranth; *Amaranthus palmeri*), hosobainubiyu (common waterhemp; *Amaranthus rudis*), butakusa (common ragweed; *Ambrosia artemisiaefolia*), inubie (common barnyardgrass; *Echinochloa crus-galli*), and akinoenokorogusa (giant foxtail; *Setaria faberi*)) and soybeans are seeded to a plastic pot. On the same day, 80 g/ha of the compound X and 1169 mL/ha of CLARITY® (dicamba diglycolamine salt 480 g/L, manufactured by BASF Corp.) are applied to the surface of soil at the sprayed water amount of 200 L/ha. The plants are then grown in a greenhouse, and 21 days after the application, the effects on the weeds and crop injuries on soybeans are investigated. A synergistic weed control effect compared to the single use of each of the compounds is confirmed.

Example 3

The weeds (ohonagaaogeito (Palmer amaranth; *Amaranthus palmeri*), hosobainubiyu (common waterhemp; *Amaranthus rudis*), butakusa (common ragweed; *Ambrosia artemisiaefolia*), obutakusa (giant ragweed; *Ambrosia trifida*), himemukashiyomogi (marestail; *Conyza canadensis*), shiroza (common lambsquarters; *Chenopodium album*), hokigi (*kochia*; *Kochia scoparia*), inubie (common barnyardgrass; *Echinochloa crus-galli*), and akinoenokorogusa (giant foxtail; *Setaria faberi*)) and soybeans are seeded to a plastic pot. The plants are then grown in a greenhouse, and 21 days after seeding, 20 g/ha of the compound X and 1169 mL/ha of CLARITY® (dicamba diglycolamine salt 480 g/L, manufactured by BASF Corp.) are applied to the foliage at the sprayed water amount of 200 L/ha. The plants are then grown in a greenhouse, and 14 days after the application, the effects on the weeds and crop injuries on soybeans are investigated. A synergistic weed control effect compared to the single use of each of the compounds is confirmed.

Example 4

The weeds (ohonagaaogeito (Palmer amaranth; *Amaranthus palmeri*), hosobainubiyu (common waterhemp; *Amaranthus rudis*), butakusa (common ragweed; *Ambrosia artemisiaefolia*), obutakusa (giant ragweed; *Ambrosia trifida*), himemukashiyomogi (marestail; *Conyza canadensis*), shiroza (common lambsquarters; *Chenopodium album*), hokigi (*kochia*; *Kochia scoparia*), inubie (common barnyardgrass; *Echinochloa crus-galli*), and akinoenokorogusa (giant foxtail; *Setaria faberi*)) are seeded to a plastic pot. On the same day, 20 g/ha of the compound X and 935 mL/ha (12.8 fluid ounce/acre) of ENGENIA® (dicamba BAPMA salt 600 g/L, manufactured by BASF Corp.) are applied to the surface of soil at the sprayed water amount of 200 L/ha. The plants are then cultivated in a greenhouse, and at seven days after the application, soybeans are seeded. Fourteen days after seeding the soybeans, the effects on the weeds and crop injuries on the soybeans are investigated. A synergistic weed control effect compared to the single use of each of the compounds is confirmed.

Example 5

The weeds (ohonagaaogeito (Palmer amaranth; *Amaranthus palmeri*), hosobainubiyu (common waterhemp; *Amaranthus rudis*), butakusa (common ragweed; *Ambrosia artemisiaefolia*), inubie (common barnyardgrass; *Echinochloa crus-galli*), and akinoenokorogusa (giant foxtail; *Setaria faberi*)) and soybeans are seeded to a plastic pot. On the same day, 80 g/ha of the compound X and 935 mL/ha of ENGENIA® (dicamba BAPMA salt 600 g/L, manufactured by BASF Corp.) are applied to the surface of soil at the sprayed water amount of 200 L/ha. The plants are then grown in a greenhouse, and 21 days after the application, the effects on the weeds and crop injuries on soybeans are investigated. A synergistic weed control effect compared to the single use of each of the compounds is confirmed.

Example 6

The weeds (ohonagaaogeito (Palmer amaranth; *Amaranthus palmeri*), hosobainubiyu (common waterhemp; *Amaranthus rudis*), butakusa (common ragweed; *Ambrosia artemisiaefolia*), obutakusa (giant ragweed; *Ambrosia trifida*), himemukashiyomogi (marestail; *Conyza canadensis*), shiroza (common lambsquarters; *Chenopodium album*), hokigi (*kochia; Kochia scoparia*), inubie (common barnyardgrass; *Echinochloa crus-galli*), and akinoenokorogusa (giant foxtail; *Setaria faberi*)) and soybeans are seeded to a plastic pot. The plants are then grown in a greenhouse, and 21 days after seeding, 20 g/ha of the compound X and 935 mL/ha of ENGENIA® (dicamba BAPMA salt 600 g/L, manufactured by BASF Corp.) are applied to the foliage at the sprayed water amount of 200 L/ha. The plants are then grown in a greenhouse, and 14 days after the application, the effects on the weeds and crop injuries on soybeans are investigated. A synergistic weed control effect compared to the single use of each of the compounds is confirmed.

Example 7

Similar procedures to those in Examples 1 to 3 are performed, replacing 1169 mL/ha (1 pint/acre) of CLARITY® with 4.677 L/ha (64 fluid ounce/acre) of ROUNDUP® XTEND (glyphosate monoethanolamine salt 240 g/L+dicamba diglycolamine salt 120 g/L, manufactured by Monsanto Company).

Example 8

Similar procedures to those in Examples 4 to 6 are performed, adding the application of 2.338 L/ha (32 fluid ounce/acre) of ROUNDUP WEATHERMAX® glyphosate potassium salt 660 g/L, manufactured by Monsanto Company).

Example 9

Similar procedures to those in Examples 1 to 8 are performed, replacing soybeans with corn or cotton.

Example 10

NIPSIT® (clothianidin 600 g/L, manufactured by Valent U.S.A. LLC) is applied to seeds of soybeans (variety: GENUITY® ROUNDUP READY 2 YIELD® soybean) so that the application rate of NIPSIT® may be 206 mL/kg seeds (1.28 fluid ounce/100 pond seeds). The formulation containing the compound X (the emulsifiable concentrate prepared by well-mixing 5 parts by weight of compound X, 2 parts by weight of GERONOL® FF/4-E (manufactured by Rhodia), 8 parts by weight of GERONOL® FF/6-E (manufactured by Rhodia) and 85 parts by weight of SOLVESSO™ 200 (manufactured by Exxon Mobile Corporation); hereinafter, referring to as "formulation X") and CLARITY® (dicamba diglycolamine salt 480 g/L, manufactured by BASF Corp.) are mixed with water, followed by applying to the field before seeding the soybeans so that the application rate of the compound X may be 5, 20, or 80 g/ha, and the application rate of dicamba diglycolamine salt may be 560 g/ha. Seven days after the application, the soybeans are seeded at the field. At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 11

NIPSIT® is applied to the seeds of soybean in the same manner as Example 10. The formulation X, CLARITY® (dicamba diglycolamine salt 480 g/L, manufactured by BASF Corp.) and ROUNDUP WEATHERMAX® are applied to the field before seeding the soybeans so that the application rate of the compound X may be 5, 20, or 80 g/ha, the application rate of dicamba diglycolamine salt may be 560 g/ha, and the application rate of ROUNDUP WEATHERMAX® (glyphosate potassium salt 660 g/L, manufactured by Monsanto Company) may be 2.338 L/ha (32 fluid ounce/acre). Seven days after the application, the soybeans are seeded to the field. At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 12

NIPSIT® is applied to the seeds of soybean in the same manner as Example 10, followed by seeding to a field. On the next day of the seeding, the formulation X and CLARITY® (dicamba diglycolamine salt 480 g/L, manufactured by BASF Corp.) are applied to the field so that the application rate of the compound X may be 5, 20, or 80 g/ha, and the application rate of dicamba diglycolamine salt may be 560 g/ha. At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 13

NIPSIT® is applied to the seeds of soybean in the same manner as Example 10, followed by seeding to a field. On the next day of the seeding, the formulation X, CLARITY® (dicamba diglycolamine salt 480 g/L, manufactured by BASF Corp.) and ROUNDUP WEATHERMAX® are applied to the field so that the application rate of the compound X may be 5, 20, or 80 g/ha, the application rate of dicamba diglycolamine salt may be 560 g/ha, and the application rate of ROUNDUP WEATHERMAX® (glyphosate potassium salt 660 g/L, manufactured by Monsanto Company) may be 2.338 L/ha (32 fluid ounce/acre). At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 14

NIPSIT® (clothianidin 600 g/L, manufactured by Valent U.S.A. LLC) is applied to seeds of soybeans (variety: GENUITY® ROUNDUP READY 2 YIELD® soybean) so that the application rate of NIPSIT® may be 206 mL/kg seeds (1.28 fluid ounce/100 pond seeds). The formulation containing the compound X (the emulsifiable concentrate prepared by well-mixing 5 parts by weight of compound X, 2 parts by weight of GERONOL® FF/4-E (manufactured by Rhodia), 8 parts by weight of GERONOL® FF/6-E (manufactured by Rhodia) and 85 parts by weight of SOLVESSO™ 200 (manufactured by Exxon Mobile Corporation); above-mentioned "formulation X") and ENGENIA® (dicamba BAPMA salt 600 g/L, manufactured by BASF Corp.) are mixed with water, followed by applying to the field before seeding the soybeans so that the application rate of the compound X may be 5, 20, or 80 g/ha, and the application rate of dicamba BAPMA salt may be 560 g/ha. Seven days after the application, the soybeans are seeded at the field. At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 15

NIPSIT® is applied to the seeds of soybean in the same manner as Example 14. The formulation X, ENGENIA® (dicamba BAPMA salt 600 g/L, manufactured by BASF Corp.) and ROUNDUP WEATHERMAX® are applied to the field before seeding the soybeans so that the application rate of the compound X may be 5, 20, or 80 g/ha, the application rate of dicamba BAPMA salt may be 560 g/ha, and the application rate of ROUNDUP WEATHERMAX® (glyphosate potassium salt 660 g/L, manufactured by Monsanto Company) may be 2.338 L/ha (32 fluid ounce/acre). Seven days after the application, the soybeans are seeded to the field. At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 16

NIPSIT® is applied to the seeds of soybean in the same manner as Example 14, followed by seeding to a field. On the next day of the seeding, the formulation X and ENGENIA® (dicamba BAPMA salt 600 g/L, manufactured by BASF Corp.) are applied to the field so that the application rate of the compound X may be 5, 20, or 80 g/ha, and the application rate of dicamba BAPMA salt may be 560 g/ha. At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Example 17

NIPSIT® is applied to the seeds of soybean in the same manner as Example 14, followed by seeding to a field. On the next day of the seeding, the formulation X, ENGENIA® (dicamba BAPMA salt 600 g/L, manufactured by BASF Corp.) and ROUNDUP WEATHERMAX® are applied to the field so that the application rate of the compound X may be 5, 20, or 80 g/ha, the application rate of dicamba BAPMA salt may be 560 g/ha, and the application rate of ROUNDUP WEATHERMAX® (glyphosate potassium salt 660 g/L, manufactured by Monsanto Company) may be 2.338 L/ha (32 fluid ounce/acre). At three true leaf stage of the soybeans, ROUNDUP WEATHERMAX® (glyphosate potassium salt 660 g/L, manufactured by Monsanto Company) is applied to the field so that the application rate may be 2.338 L/ha (32 fluid ounce/acre).

Examples 18 to 21

In each of Examples 10 to 13, instead of applying the formulation X and CLARITY®, the formulation X, CLARITY®, and VALOR® SX (flumioxazine 51%, manufactured by Valent U.S.A. LLC) are applied so that the application rate of the compound X may be 5, 20, or 80 g/ha, the application rate of dicamba diglycolamine salt may be 560 g/ha, and the application rate of VALOR® SX may be 210 g/ha.

Examples 22 to 25

In each of Examples 14 to 17, instead of applying the formulation X and ENGENIA®, the formulation X, ENGENIA®, and VALOR® SX (flumioxazine 51%, manufactured by Valent U.S.A. LLC) are applied so that the application rate of the compound X may be 5, 20, or 80 g/ha, the application rate of dicamba BAPMA salt may be 560 g/ha, and the application rate of VALOR® SX may be 210 g/ha.

Examples 26 to 33

In each of Examples 18 to 25, VALOR® XLT (flumioxazine 30%+chlorimuron-ethyl 10.3%, manufactured by Valent U.S.A. LLC) is used in place of VALOR® SX, and is applied so that the application rate of VALOR® XLT may be 315 g/ha.

Examples 34 to 57

In each of Examples 10 to 33, INOVATE® (clothianidin 160 g/L+metalaxyl 13 g/L+ipconazole 8 g/L, manufactured by Valent U.S.A. LLC) is used in place of NIPSIT®, and is applied so that the application rate of INOVATE® may be 309 mL/100 kg seeds (4.74 fluid ounce/100 pond seeds).

Examples 58 to 81

In each of Examples 10 to 33, CRUISERMAXX® Vibrance (thiamethoxam 240 g/L+metalaxyl M 36 g/L+fludioxonil 12 g/L+sedaxane 12 g/L, manufactured by Syngenta Ltd.) is used in place of NIPSIT®, and is applied so that the application rate of CRUISERMAXX® Vibrance may be 235 mL/100 kg seeds (3.22 fluid ounce/100 pond seeds).

Examples 82 to 105

In each of Examples 10 to 33, ACCELERON® system (DX-612 (fluxapyroxad 326 g/L, manufactured by Monsanto Company) 31 ml/100 kg seeds+DX-309 (metalaxyl 313 g/L, manufactured by Monsanto Company) 242 ml/100 kg seeds (1.5 fluid ounce/100 pond seeds)+DX-109 (pyraclostrobin 200 g/L, manufactured by Monsanto Company) 242 ml/100 kg seeds (1.5 fluid ounce/100 pond seeds)+IX-104 (imidacloprid 600 g/L, manufactured by Monsanto Company) 515 ml/100 kg seeds (3.2 fluid ounce/100 pond seeds)) is applied instead of applying NIPSIT® to the seeds of soybean.

Examples 106 to 201

In each of Examples 10 to 105, seeds of corn or cotton are used in place of seeds of soybean.

In above Examples 10 to 201, excellent herbicidal effects, effects on controlling harmful arthropods, and/or effects on controlling plant pathogens are confirmed, and crop injuries are confirmed to pose little problem.

Example 202

A plastic pot was filled with a commercially-available culture soil, and thereto inubie (common barnyardgrass; *Echinochloa crus-galli*) or akinoenokorogusa (giant foxtail; *Setaria faberi*) was seeded, and covered with the soil to about 0.5 cm, followed by growing the weeds in a greenhouse. When the weeds grew to two to three leaf stage, a spray liquid of the compound X, a spray liquid of dicamba diglycolamine salt, or a spray liquid of the present composition was uniformly sprayed to the whole plants so that the application rate might be a predetermined value. The spray liquid of the present composition was prepared by mixing the spray liquid of the compound X with the spray liquid of dicamba diglycolamine salt. The spray liquid of the compound X was prepared by mixing a predetermined amount of the formulation X with deionized water. The spray liquid of dicamba diglycolamine salt was prepared by dissolving dicamba diglycolamine salt with a 2 wt % solution of TWEEN® 20 (polyoxyethylenesorbitan fatty acid ester, manufactured by MP Biomedicals) in dimethylformamide, followed by mixing with deionized water. After applying the spray liquid, the plants were placed in a greenhouse for a week. A herbicidal effect was evaluated by classifying the effect into 101 stages from 0 (no effect) to 100 (completely dead).

The expected value of the herbicidal effect in the case of mixed use was calculated from the result of the herbicidal effect in the case of single use of each of the compounds (the value of A or B) according to the formula of Colby ((expected value)=100−(100−A)×(100−B)/100).

The results are shown in Tables 1 and 2.

TABLE 1

| Compound X | Application rate (g/ha) dicamba diglycolamine salt | Herbicidal effect on *Echinochloa crus-galli* (observed value) | Herbicidal effect on *Echinochloa crus-galli* (expected value) |
|---|---|---|---|
| 5 | — | 20 | — |
| 10 | — | 35 | — |
| — | 50 | 0 | — |
| — | 500 | 10 | — |
| 5 | 50 | 80 | 20 |
| 5 | 500 | 85 | 28 |
| 10 | 50 | 90 | 35 |
| 10 | 500 | 95 | 41.5 |

TABLE 2

| Compound X | Application rate (g/ha) dicamba diglycolamine salt | Herbicidal effect on *Setaria faberi* (observed value) | Herbicidal effect on *Setaria faberi* (expected value) |
|---|---|---|---|
| 5 | — | 30 | — |
| 10 | — | 45 | — |
| — | 50 | 0 | — |
| — | 500 | 0 | — |
| 5 | 50 | 93 | 30 |
| 5 | 500 | 90 | 37 |
| 10 | 50 | 95 | 45 |
| 10 | 500 | 95 | 50.5 |

Example 203

A plastic pot was filled with a commercially-available culture soil, and thereto inubie (common barnyardgrass; *Echinochloa crus-galli*) or akinoenokorogusa (giant foxtail; *Setaria faberi*) was seeded, and covered with the soil to about 0.5 cm, followed by growing the weeds in a greenhouse. When the weeds grew to two to three leaf stage, a spray liquid of the compound X, a spray liquid of dicamba BAPMA salt, or a spray liquid of the present composition was uniformly sprayed to the whole plants so that the application rate might be a predetermined value. The spray liquid of the present composition was prepared by mixing the spray liquid of the compound X with the spray liquid of dicamba BAPMA salt. The spray liquid of the compound X was prepared by mixing a predetermined amount of the formulation X with deionized water. The spray liquid of dicamba BAPMA salt was prepared by dissolving dicamba BAPMA salt with a 2 wt % solution of TWEEN® 20 (polyoxyethylenesorbitan fatty acid ester, manufactured by MP Biomedicals) in dimethylformamide, followed by mixing with deionized water. After applying the spray liquid, the plants were placed in a greenhouse for a week. A herbicidal effect was evaluated by classifying the effect into 101 stages from 0 (no effect) to 100 (completely dead).

The expected value of the herbicidal effect in the case of mixed use was calculated from the result of the herbicidal effect in the case of single use of each of the compounds (the value of A or B) according to the formula of Colby ((expected value)=100−(100−A)×(100−B)/100).

The results are shown in Tables 3 and 4.

TABLE 3

| Application rate (g/ha) | | Herbicidal effect on Echinochloa crus-galli (observed value) | Herbicidal effect on Echinochloa crus-galli (expected value) |
| --- | --- | --- | --- |
| Compound X | dicamba BAPMA salt | | |
| 5  | —   | 20 | —    |
| 10 | —   | 35 | —    |
| —  | 50  | 0  | —    |
| —  | 500 | 5  | —    |
| 5  | 50  | 80 | 20   |
| 5  | 500 | 85 | 24   |
| 10 | 50  | 90 | 35   |
| 10 | 500 | 93 | 38.25 |

TABLE 4

| Application rate (g/ha) | | Herbicidal effect on Setaria faberi (observed value) | Herbicidal effect on Setaria faberi (expected value) |
| --- | --- | --- | --- |
| Compound X | dicamba BAPMA salt | | |
| 5  | —   | 30 | —   |
| 10 | —   | 45 | —   |
| —  | 50  | 0  | —   |
| —  | 500 | 10 | —   |
| 5  | 50  | 90 | 30  |
| 5  | 500 | 90 | 37  |
| 10 | 50  | 95 | 45  |
| 10 | 500 | 95 | 50.5 |

The herbicidal effect of the present composition was synergistically high compared to that of single use of each of the compounds.

INDUSTRIAL APPLICABILITY

The herbicidal composition of the present invention can effectively control weeds.

The invention claimed is:

1. A herbicidal composition comprising ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate and one or more dicamba salts selected from the group consisting of dicamba diglycolamine salt and dicamba N,N-bis(3-aminopropyl)methylamine salt, wherein a weight ratio of ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate to the dicamba salt(s) is 1:5 to 1:100.

2. The herbicidal composition according to claim 1, wherein the dicamba salt is a dicamba diglycolamine salt.

3. The herbicidal composition according to claim 1, wherein the dicamba salt is a dicamba N,N-bis(3-aminopropyl)methylamine salt.

4. A method for controlling weeds, comprising a step of applying the herbicidal composition according to claim 1 to a place where weeds are growing or will grow.

5. The method according to claim 4, wherein the place where weeds are growing or will grow is a crop field.

6. The method according to claim 5, wherein the crop field is a field of soybeans, corn, or cotton.

* * * * *